(12) United States Patent
Kupratis et al.

(10) Patent No.: US 8,915,700 B2
(45) Date of Patent: Dec. 23, 2014

(54) GAS TURBINE ENGINE WITH FAN-TIED INDUCER SECTION AND MULTIPLE LOW PRESSURE TURBINE SECTIONS

(75) Inventors: Daniel Bernard Kupratis, Wallingford, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 493 days.

(21) Appl. No.: 13/407,899

(22) Filed: Feb. 29, 2012

(65) Prior Publication Data

US 2013/0223986 A1    Aug. 29, 2013

(51) Int. Cl.
F01D 1/00 (2006.01)
(52) U.S. Cl.
USPC ............. 415/60; 415/66; 415/69; 415/122.1; 416/122; 416/126; 416/128; 416/170 R
(58) Field of Classification Search
USPC ............. 415/60, 66, 69, 122.1; 416/120, 122, 416/124, 126, 128, 170 R, 172
See application file for complete search history.

(56) References Cited

U.S. PATENT DOCUMENTS

| | | | |
|---|---|---|---|
| 4,055,042 A | 10/1977 | Colley | |
| 4,732,535 A | 3/1988 | Tubbs | |
| 4,860,537 A * | 8/1989 | Taylor | 415/65 |
| 5,279,109 A | 1/1994 | Liu et al. | |
| 5,381,653 A * | 1/1995 | Althaus | 60/792 |
| 6,672,049 B2 * | 1/2004 | Franchet et al. | 60/226.1 |
| 7,716,914 B2 * | 5/2010 | Schilling | 60/268 |
| 7,726,113 B2 * | 6/2010 | Orlando et al. | 415/61 |
| 7,927,075 B2 | 4/2011 | Suciu et al. | |
| 2002/0189231 A1 | 12/2002 | Franchet et al. | |
| 2007/0084186 A1 | 4/2007 | Orlando et al. | |
| 2008/0219833 A1 | 9/2008 | Suciu et al. | |
| 2008/0226453 A1 | 9/2008 | Nordeen et al. | |
| 2009/0056306 A1 | 3/2009 | Suciu et al. | |
| 2010/0154383 A1 | 6/2010 | Ress, Jr. | |
| 2011/0167791 A1 | 7/2011 | Johnson et al. | |

FOREIGN PATENT DOCUMENTS

EP    1939430 A2    7/2008

OTHER PUBLICATIONS

International Preliminary Report on Patentability for International Application No. PCT/US2013/026075 mailed on Sep. 12, 2014.

* cited by examiner

*Primary Examiner* — Igor Kershteyn
(74) *Attorney, Agent, or Firm* — Carlson, Gaskey & Olds, PC

(57) ABSTRACT

A gas turbine engine includes a first shaft defining an axis of rotation and a second shaft rotatable about the axis of rotation and spaced radially outwardly relative to the first shaft. A speed change mechanism is driven by the second shaft. A fan includes a fan rotor driven by the speed change mechanism such that the fan and the first shaft rotate at a slower speed than the second shaft. At least one inducer stage is positioned aft of the fan and is coupled for rotation with the fan rotor.

19 Claims, 1 Drawing Sheet

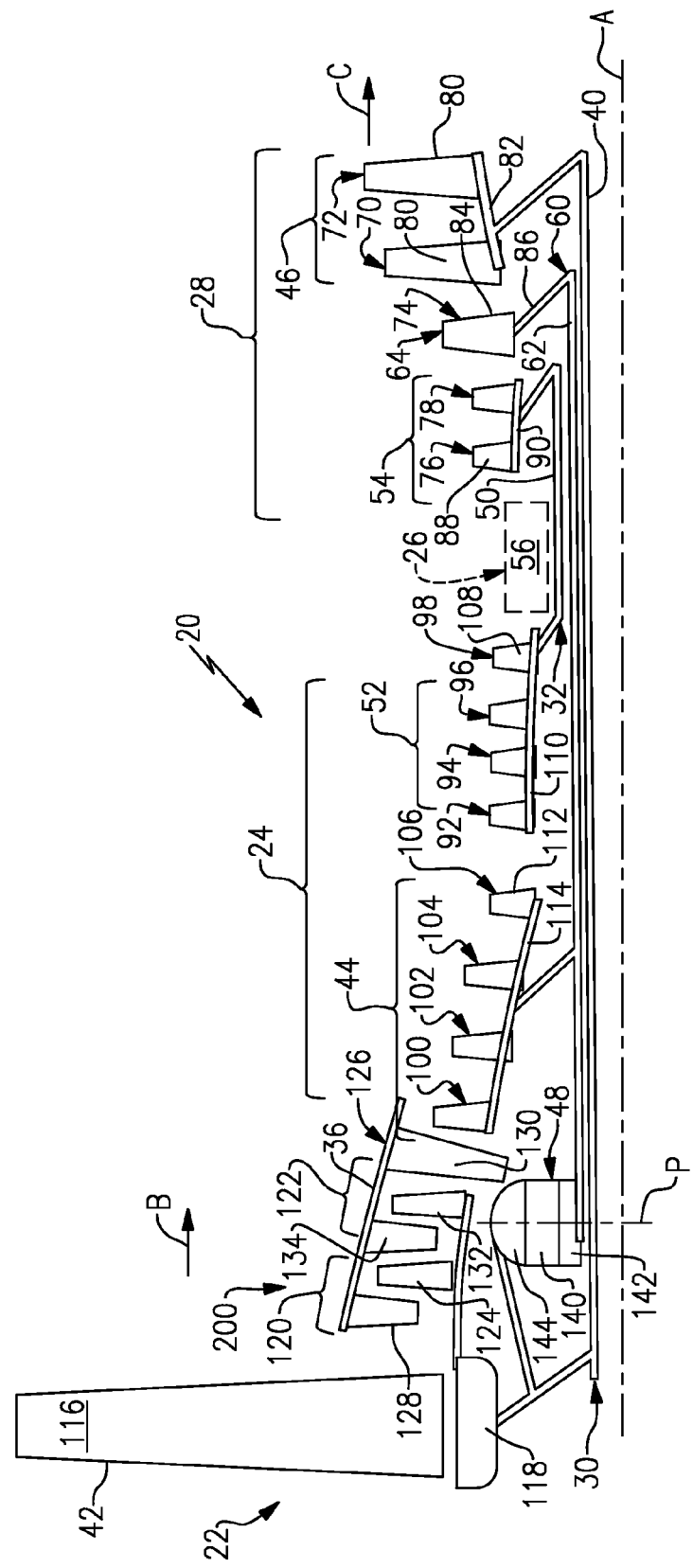

GAS TURBINE ENGINE WITH FAN-TIED INDUCER SECTION AND MULTIPLE LOW PRESSURE TURBINE SECTIONS

BACKGROUND OF THE INVENTION

This disclosure relates to a gas turbine engine with a fan-tied inducer section and multiple low pressure turbine sections.

A typical jet engine has multiple shafts or spools that transmit torque between turbine and compressor sections of the engine. In one example, a low speed spool generally includes a low shaft that interconnects a fan, a low pressure compressor, and a low pressure turbine. The low pressure turbine drives the low shaft, which drives the low pressure compressor. A geared architecture connects the low shaft to the fan. Air exiting the fan at the root has relatively low energy, which causes a swirling effect that makes it difficult to efficiently feed air into the low pressure compressor. Additionally, the use of multiple compressor stages in the faster rotating compressor section provides for increased inertia in this section, which can adversely affect engine operability.

SUMMARY OF THE INVENTION

In one exemplary embodiment, a gas turbine engine includes a first shaft defining an axis of rotation, a second shaft rotatable about the axis of rotation and spaced radially outwardly relative to the first shaft, and a speed change mechanism driven by the second shaft. A fan includes a fan rotor driven by the speed change mechanism and the first shaft. The fan and the first shaft rotate at a slower speed than the second shaft. At least one inducer stage is positioned aft of the fan and coupled for rotation with the fan rotor.

In a further embodiment of the above, the at least one inducer stage comprises one or more inducer blades fixed for rotation with the fan rotor and a core inlet stator fixed to a non-rotating engine structure.

In a further embodiment of any of the above, the core inlet stator is positioned axially between the fan and the inducer blades.

In a further embodiment of any of the above, the core inlet stator is positioned aft of the inducer blades.

In a further embodiment of any of the above, the at least one inducer stage comprises a plurality of inducer stages coupled to the fan rotor with each inducer stage comprising one or more inducer blades fixed for rotation with the fan rotor and a core inlet stator fixed to a non-rotating engine structure.

In a further embodiment of any of the above, the gas turbine engine includes a third shaft rotatable about the axis of rotation and spaced radially outwardly relative to the second shaft. The first shaft is driven by an aft low pressure turbine, the second shaft is driven by a mid-low pressure turbine, and the third shaft is driven by a high pressure turbine.

In a further embodiment of any of the above, the aft low pressure turbine comprises one or two turbine stages, the mid-low pressure turbine comprises a plurality of turbine stages, and the high pressure turbine comprises one or two turbine stages.

In a further embodiment of any of the above, the speed change mechanism comprises a geared architecture with a sun gear driven by the second shaft, a plurality of star gears in meshing engagement with the sun gear, and a ring gear in meshing engagement with the star gears, the ring gear providing driving output to the fan rotor.

In a further embodiment of any of the above, the first shaft has a direct drive to the fan.

In another exemplary embodiment, a gas turbine engine includes a first shaft defining an axis of rotation, a second shaft rotatable about the axis of rotation and spaced radially outwardly relative to the first shaft, and a speed change mechanism driven by the second shaft. A fan section includes at least one fan blade coupled to a fan rotor wherein the fan rotor is driven by the speed change mechanism. A first compressor section is driven by the first shaft and a second compressor section is driven by the second shaft. At least one inducer stage is positioned aft of the fan blade and coupled for rotation with the fan rotor about the axis of rotation.

In a further embodiment of any of the above, the at least one inducer stage comprises a plurality of inducer stages.

In a further embodiment of any of the above, a rotational speed of the second shaft is greater than the rotational speed of the first shaft.

In a further embodiment of any of the above, the speed change mechanism comprises a geared architecture with a sun gear driven by the second shaft, a plurality of star gears in meshing engagement with the sun gear, and a ring gear in meshing engagement with the star gears, the ring gear providing driving output to the fan rotor.

In a further embodiment of any of the above, the first shaft has direct drive to the fan.

In a further embodiment of any of the above, the gas turbine engine includes a third shaft rotatable about the axis of rotation and spaced radially outwardly relative to the second shaft, and includes a third turbine section driving the third shaft. The second turbine section is positioned aft of the third turbine section and the first turbine section is positioned aft of the second turbine section.

In a further embodiment of any of the above, the first turbine section comprises an aft low pressure turbine, the second turbine section comprises a mid-low pressure turbine, and the third turbine section comprises a high pressure turbine.

In a further embodiment of any of the above, the at least one inducer stage comprises one or more inducer blades fixed for rotation with the fan rotor and a core inlet stator fixed to a non-rotating engine structure.

In a further embodiment of any of the above, the core inlet stator is positioned axially between the fan blades and the inducer blades.

In a further embodiment of any of the above, the core stator is positioned aft of the inducer blades.

These and other features of this application will be best understood from the following specification and drawings, the following of which is a brief description.

BRIEF DESCRIPTION OF THE DRAWINGS

FIG. 1 is a schematic representation of an engine upper half including an inducer section coupled to a fan and multiple turbine sections.

DETAILED DESCRIPTION

FIG. 1 schematically illustrates a gas turbine engine 20. The gas turbine engine 20 is disclosed herein as a multi-spool turbofan that generally incorporates a fan section 22, a compressor section 24, a combustor section 26, and a turbine section 28.

Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems (not shown). The engine 20 also includes a middle spool 60 mounted for rotation about the longitudinal axis A. The middle spool 60 is positioned radially outward of the low speed spool 30 and radially inwardly of the high speed spool 32.

The low speed spool 30 generally includes a low or an inner shaft 40 that interconnects a fan 42 and an aft low pressure turbine 46. The middle spool 60 includes a middle shaft 62 that interconnects a mid-low pressure turbine 64 (positioned forward of the aft low pressure turbine 46), a low pressure compressor 44, and a speed change mechanism 48, such as a geared architecture, for example. The inner shaft 40 comprises a direct drive to the fan 42 and rotates at a lower speed than the middle shaft 62. The middle shaft 62 turns at a higher speed for an input into the speed change mechanism 48, while the slower rotating low shaft 40 is coupled to an output from the speed change mechanism 48.

The high speed spool 32 includes a high or an outer shaft 50 that interconnects a high pressure compressor 52 and high pressure turbine 54. A combustor 56 is arranged between the high pressure compressor 52 and the high pressure turbine 54.

The core airflow is compressed by the low pressure compressor 44 and the high pressure compressor 52, mixed and burned with fuel in the combustor 56, then expanded over the high pressure turbine 54 and low pressure turbines 64, 46. The turbines 46, 54, 64 rotationally drive the respective low speed spool 30, high speed spool 32, and middle spool 60 in response to the expansion.

The engine 20 in one example is a high-bypass geared aircraft engine. In a further example, the engine 20 bypass ratio is greater than about six (6), with an example embodiment being greater than ten (10), the speed change mechanism 48 is an epicyclic gear train, such as a planetary gear system or other gear system, with a gear reduction ratio of greater than about 2.3, and the low pressure turbine 46 has a pressure ratio that is greater than about 5.

In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The speed change mechanism 48 may be an epicycle gear train, such as a planetary gear system or star gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm per hour of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram deg R)/518.7)^0.5]. The "Low corrected fan tip speed" as disclosed herein according to one non-limiting embodiment is less than about 1150 ft/second.

In the example shown, the aft low pressure turbine 46 is comprised of a plurality of stages including at least a first stage 70 and a second stage 72. The mid-low pressure turbine 64 is comprised of at least one stage 74. The high pressure turbine 54 is comprised of a first stage 76 and a second stage 78 that are positioned forward of the plurality of stages 70, 72, 74 of the low pressure turbines 46, 64. This is just one example of a turbine stage configuration, it should be understood that the various disclosed turbine sections could include any number of stages.

Each of the stages for the high pressure turbine 54, aft low pressure turbine 46, and mid-low pressure turbine 64 includes a plurality of blades coupled to a respective rotor. In the example shown, blades 80 of the aft low pressure turbine 46 are coupled to a first rotor 82 and blades 84 of the mid-low pressure turbine 46 are coupled to a second rotor 86. Blades 88 of the high pressure turbine 54 are coupled to a third rotor 90. The first rotor 82 is configured to drive the low shaft 40, the second rotor 86 is configured to drive the speed change mechanism 48 via the middle shaft 62, and the third rotor 90 is configured to drive the high shaft 50. Each stage of the high 54 and low 46, 64 pressure turbines also includes a plurality of vanes (not shown) positioned adjacent the blades. The vanes are mounted to the static engine structure 36.

In one example, the high pressure compressor 52 is comprised of first 92, second 94, third 96, and fourth 98 stages. The low pressure compressor 44 is comprised of first 100, second 102, third 104, and fourth 106 stages that are positioned forward of the plurality of stages 92, 94, 96, 98 of the high pressure compressor 52. Each of the stages of the high pressure compressor 52 includes a plurality of blades 108 that are coupled to a rotor 110 that is driven by the high shaft 50. Each of the stages of the low pressure compressor 44 is comprised of blades 112 that are coupled to a rotor 114 that is driven by the middle shaft 62. Each stage of the high 52 and low 44 pressure compressors also includes a plurality of vanes (not shown) positioned adjacent the blades, where the vanes are mounted to the static engine structure 36. Various bearings rotatably support the high 50, middle 62, and low 40 shafts as known.

The fan section 22 includes a fan 42 that is driven by the speed change mechanism 48 and slower rotating low shaft 40. The fan 42 is comprised of a plurality of fan blades 116 that are coupled to a fan rotor 118 for rotation about the axis. The speed change mechanism 48 couples the middle shaft 62 to the fan rotor 118 such that the fan rotor 118 and low shaft 40 rotate at a lower speed than the middle shaft 62.

In one example, the speed change mechanism 48 comprises a gearbox of an epicyclic gear arrangement that includes a plurality of star gears 140 driven by a sun gear 142 fixed for rotation with the middle shaft 62. The star gears 140 drive a ring gear 144 that is configured to drive the fan rotor 118 and low shaft 40. The gearbox defines a gearbox axial center-plane P which is normal to the axis of rotation. The location of the gearbox axial center-plane P could be in various axial positions along the axis of rotation.

The engine 20 also includes an inducer section 200 that comprises a fan-tied compressor stage, i.e. the inducer section is an additional low pressure compressor stage that is connected to the fan rotor 118. The inducer section 200 serves to efficiently feed the low pressure compressor 44 to provide a more controlled/stabilized air flow. Various examples of engines with inducer sections are found in co-pending U.S. application Ser. No. 13/406,819, filed Feb. 28, 2012, and entitled "GAS TURBINE ENGINE WITH FAN-TIED INDUCER SECTION," which is assigned to the same assignee as the present application, and is hereby incorporated by reference.

The inducer section 200 can include one or more inducer stages that are driven by the fan rotor 118. In one example, the inducer section 200 includes a first inducer stage 120 and a second inducer stage 122. The first inducer stage 120 comprises one or more blades 124 fixed for rotation with the fan rotor 118 and a core inlet stator structure 126 fixed to the non-rotating static engine structure 36. The core inlet stator structure 126 is configured to facilitate reducing swirl coming off of the fan and diffusing the air flow. The core inlet stator structure 126 includes one or more vanes 128 fixed to the static engine structure 36. The vanes 128 are positioned forward of the blades 124. Additional support for the core inlet stator structure 126 is provided by a connection to a strut 130.

The second inducer stage 122 comprises one or more blades 132 fixed for rotation with the fan rotor 118 and the core inlet stator structure 126 fixed to the static engine structure 36 as describe above. The core inlet stator structure 126 can optionally include a second set of vanes 134 positioned aft of the blades 124 of the first inducer stage 120 and forward of the blades 132 of the second inducer stage 122. Optionally the vanes in either stage 120, 122 could be positioned respectively aft of each set of blades instead of forward of the blades.

In one example, the low pressure compressor 44 is positioned immediately aft of the inducer section 200 and gearbox axial center-plane P.

In one example, one or more of the core inlet stator vanes could comprise a variable vane as discussed in applicant's co-pending application referenced above. Further, as discussed above, in one example the speed change mechanism 48 comprises a gearbox with a star gear configuration. Optionally, the gearbox could comprise a planetary type gearbox configuration. An example, of such a gearbox is discussed in applicant's co-pending application discussed above.

The various configurations described above provide a geared turbofan with a slow turning, fan-tied auxiliary compressor stage or stages, and a separate higher speed mid-low pressure turbine/low pressure compressor shaft. The fan is driven through the speed change mechanism as well as through a direct drive turbine via the low shaft. The inducer is an additional low pressure compressor stage or stages that are connected to the fan rotor itself, immediately aft of the fan rotor and turning at the same speed and in the same direction. The low pressure turbine has two sections as described above, with the forward section turning at a higher speed for input to the speed change mechanism and the aft section turning at a lower speed with direct drive to the fan. This provides several benefits.

For example, the configurations disclosed above improve engine operability by reducing the pressure rise required of the higher speed low pressure compressor and moving pressure to the lower speed fan rotor and associated inducer stage. Relative to a configuration that does not have an inducer section, the inertia of the stages in an inducer configuration is decreased by a factor of $1/GR^2$ where $GR^2$ is the square of the speed reduction ratio of the gear. For example, if the gear ratio GR is 2, the inertia of the fan-tied low compressor stages is reduced by the factor of 0.25. Further, the inducer section 200 enables a transition of the flow from the exit of the fan blade to the inlet of the higher speed low pressure compressor that is rapid but gradual versus a scenario where core flow is introduced directly from the exit of the fan blade to the higher speed low pressure compressor. This enables improvements in the aerodynamic efficiencies of the fan blade and the higher speed low pressure compressor.

Further, for configurations where the speed change mechanism results in the fan rotating in an opposite direction to the rotational direction of the input shaft from the turbine, the fan-tied low pressure compressor enables even more pressure to be addressed by the fan rotor as the fan-tied low pressure compressor more easily accommodates more work being done by the fan rotor than the counter rotating high speed low pressure compressor does without the presence of a fan-tied compressor stage. This also increases the supercharging temperature of the high speed low pressure compressor and, thus, results in a lower tip Mach number for the first rotor of the high speed low pressure compressor, resulting improved efficiency.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a first shaft defining an axis of rotation;
   a second shaft rotatable about the axis of rotation and spaced radially outwardly relative to the first shaft;
   a speed change mechanism driven by the second shaft;
   a fan including a fan rotor driven by the speed change mechanism and the first shaft, wherein the fan and the first shaft rotate at a slower speed than the second shaft; and
   at least one inducer stage positioned aft of the fan and coupled for rotation with the fan rotor.

2. The gas turbine engine according to claim 1, wherein the at least one inducer stage comprises one or more inducer blades fixed for rotation with the fan rotor and a core inlet stator fixed to a non-rotating engine structure.

3. The gas turbine engine according to claim 2, wherein the core inlet stator is positioned axially between the fan and the inducer blades.

4. The gas turbine engine according to claim 2, wherein the core inlet stator is positioned aft of the inducer blades.

5. The gas turbine engine according to claim 1, wherein the at least one inducer stage comprises a plurality of inducer stages coupled to the fan rotor with each inducer stage comprising one or more inducer blades fixed for rotation with the fan rotor and a core inlet stator fixed to a non-rotating engine structure.

6. The gas turbine engine according to claim 1, including a third shaft rotatable about the axis of rotation and spaced radially outwardly relative to the second shaft, and wherein the first shaft is driven by an aft low pressure turbine, the second shaft is driven by a mid-low pressure turbine, and the third shaft is driven by a high pressure turbine.

7. The gas turbine engine according to claim 6, wherein the aft low pressure turbine comprises one or two turbine stages, the mid-low pressure turbine comprises a plurality of turbine stages, and the high pressure turbine comprises one or two turbine stages.

8. The gas turbine engine according to claim 1, wherein the speed change mechanism comprises a geared architecture with a sun gear driven by the second shaft, a plurality of star gears in meshing engagement with the sun gear, and a ring gear in meshing engagement with the star gears, the ring gear providing driving output to the fan rotor.

9. The gas turbine engine according to claim 1, wherein the first shaft has a direct drive to the fan.

10. A gas turbine engine comprising:
a first shaft defining an axis of rotation;
a second shaft rotatable about the axis of rotation and spaced radially outwardly relative to the first shaft;
a speed change mechanism driven by the second shaft;
a fan section including at least one fan blade coupled to a fan rotor wherein the fan rotor is driven by the speed change mechanism;
a first compressor section driven by the first shaft;
a second compressor section driven by the second shaft; and
at least one inducer stage positioned aft of the fan blade and coupled for rotation with the fan rotor about the axis of rotation.

11. The gas turbine engine according to claim 10, wherein the at least one inducer stage comprises a plurality of inducer stages.

12. The gas turbine engine according to claim 10, wherein a rotational speed of the second shaft is greater than the rotational speed of the first shaft.

13. The gas turbine engine according to claim 12, wherein the speed change mechanism comprises a geared architecture with a sun gear driven by the second shaft, a plurality of star gears in meshing engagement with the sun gear, and a ring gear in meshing engagement with the star gears, the ring gear providing driving output to the fan rotor.

14. The gas turbine engine according to claim 13, wherein the first shaft has direct drive to the fan.

15. The gas turbine engine according to claim 14, including a third shaft rotatable about the axis of rotation and spaced radially outwardly relative to the second shaft, and including a third turbine section driving the third shaft, wherein the second turbine section is positioned aft of the third turbine section and the first turbine section is positioned aft of the second turbine section.

16. The gas turbine engine according to claim 15, wherein the first turbine section comprises an aft low pressure turbine, the second turbine section comprises a mid-low pressure turbine, and the third turbine section comprises a high pressure turbine.

17. The gas turbine engine according to claim 11 wherein the at least one inducer stage comprises one or more inducer blades fixed for rotation with the fan rotor and a core inlet stator fixed to a non-rotating engine structure.

18. The gas turbine engine according to claim 17, wherein the core inlet stator is positioned axially between the fan blades and the inducer blades.

19. The gas turbine engine according to claim 17, wherein the core stator is positioned aft of the inducer blades.

* * * * *